(12) United States Patent  
Wagner et al.

(10) Patent No.: US 12,544,028 B2  
(45) Date of Patent: Feb. 10, 2026

(54) SYSTEM AND METHOD FOR FLOW OR VELOCITY QUANTIFICATION USING CONTRAST-ENHANCED X-RAY DATA

(71) Applicant: Wisconsin Alumni Research Foundation, Madison, WI (US)

(72) Inventors: Martin Wagner, Madison, WI (US); Joseph Whitehead, Madison, WI (US); Michael Speidel, Madison, WI (US); Paul Laeseke, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 393 days.

(21) Appl. No.: 18/163,475

(22) Filed: Feb. 2, 2023

(65) Prior Publication Data

US 2024/0260916 A1 Aug. 8, 2024

(51) Int. Cl.
*A61B 6/00* (2024.01)
*A61B 6/50* (2024.01)
(Continued)

(52) U.S. Cl.
CPC .............. *A61B 6/504* (2013.01); *A61B 6/481* (2013.01); *A61B 6/5217* (2013.01);
(Continued)

(58) Field of Classification Search
CPC .................... A61B 6/481; A61B 6/486; G06T 2207/10116; G06T 2207/30104; G06T 7/0016
See application file for complete search history.

(56) References Cited

U.S. PATENT DOCUMENTS 6,005,917 A * 12/1999 Andersson ............. A61B 6/507  
    378/98.12  
8,411,924 B2 * 4/2013 Makram-Ebeid ..... G06T 7/0012  
    382/131

(Continued)

OTHER PUBLICATIONS

Jin et al., Chemoembolization Endpoints: Effect on Survival Among Patients With Hepatocellular Carcinoma, AJR Am J Roentgenol, vol. 196, No. 4, pp. 919-928, Apr. 2011, doi: 10.2214/AJR.10.4770.

(Continued)

*Primary Examiner* — Amal Aly Farag  
(74) *Attorney, Agent, or Firm* — Quarles & Brady LLP (57) ABSTRACT

A system and method are provided that includes acquiring or accessing x-ray data of a subject experiencing a delivery of a contrast agent to the vessel of the subject and generating time-attenuation curves for the vessel using the x-ray data. The method also includes identifying a plurality of points within the vessel and extending along a lumen of the vessel and sampling the time-attenuation curves at the plurality of points to generate a time-attenuation map. The method further includes performing a Fourier transform on the time-attenuation map to generate a spatio-temporal map of spatial frequency versus temporal frequency and identifying a peak frequency in the spatio-temporal map corresponding to flow or velocity in the vessel. The method then includes quantifying the flow or velocity within the vessel of the subject using the peak frequency and generating a report including quantified flow or velocity through the vessel.

20 Claims, 8 Drawing Sheets

(51) Int. Cl.
*G06T 7/00* (2017.01)
*G06T 7/254* (2017.01)

(52) U.S. Cl.
CPC ............ *G06T 7/0012* (2013.01); *G06T 7/254* (2017.01); *G06T 2207/10116* (2013.01); *G06T 2207/30104* (2013.01); *G06T 2207/30172* (2013.01)

(56) References Cited

U.S. PATENT DOCUMENTS

| | | | |
|---|---|---|---|
| 2007/0002183 A1* | 1/2007 | Fujibayashi | H04N 19/176 348/180 |
| 2007/0104317 A1* | 5/2007 | Ohishi | A61B 6/504 378/98.12 |
| 2020/0410666 A1* | 12/2020 | Wagner | G06N 3/08 |
| 2022/0361834 A1* | 11/2022 | Butler | G06T 7/20 |
| 2023/0113721 A1* | 4/2023 | Kassel | G06T 7/0016 382/128 |

OTHER PUBLICATIONS

Johnson et al., "Microvascular Perfusion Changes following Transarterial Hepatic Tumor Embolization," J Vasc Interv Radiol, vol. 27, No. 1, pp. 133-141.e3, Jan. 2016, doi: 10.1016/j.jvir.2015.06.036.
Shaughnessy et al., "Measuring blood velocity using 4D-DSA: A feasibility study," Med Phys, 45 (10) Oct. 2018.
Wu et al., "Quantification of Blood Velocity with 4D Digital Subtraction Angiography Using the Shifted Least-Squares Method," American Journal of Neuroradiology, Sep. 2018, doi: 10.3174/ajnr.A5793.

* cited by examiner

SYSTEM AND METHOD FOR FLOW OR VELOCITY QUANTIFICATION USING CONTRAST-ENHANCED X-RAY DATA

STATEMENT REGARDING FEDERALLY SPONSORED RESEARCH

This invention was made with government support under EB024677 awarded by the National Institutes of Health. The government has certain rights in the invention.

BACKGROUND

The present disclosure relates to systems and methods for medical image data acquisition and/or reconstruction. More particularly, systems and methods are provided for producing reports, which may include medical images or maps, that include quantitative velocity information.

Quantitative medical information is often indispensable to making clinical healthcare decisions. Unfortunately, many physiological and anatomical information cannot be easily quantified. For example, while lab analysis of blood samples can provide quantitative information about a wide variety of patient functions, it cannot provide information about many important physiological functions and anatomical structures, such as vascular function in a particular location, for example. Nonetheless, clinical outcomes for many conditions are directly correlated to the amount of accurate information that is available to a clinician and the speed with which the information or updated information can be provided. The ability to successfully diagnose and treat vascular conditions is highly dependent upon detailed and accurate information being available to clinicians in a timely manner. Furthermore, the dependence upon and availability of accurate information is important in both the diagnostic and treatment phases.

For example, liver embolization is a minimally invasive treatment option for patients with intermediate or advanced hepatocellular carcinoma (HCC) and select patients with liver metastases, which has shown to be safe and effective. Embolization reduces the amount of blood flow to the tumor by injecting embolic material (e.g. microspheres) into tumor feeding arteries. The amount of blood flow reduction is crucial to achieve favorable outcomes because, under embolization may fail to achieve tumor necrosis, while over embolization may result in increased loss of healthy tissue and may lead to complications. Thus, quantitative information about the blood flow through this highly-localized treatment area during this invasive procedure can drastically improve outcomes.

Unfortunately, there are currently no quantitative tools or metrics to determine procedure end points during liver embolization. As such, radiologists primarily rely on subjective visual assessments of digital subtraction angiography (DSA) images to make best estimates of when a desired blood flow reduction has been achieved. Differences in observer experience and perceptual bias may lead to high interobserver variability and reduce reproducibility.

Conventional 2D projection x-ray imaging, generally two-dimensional (2D) digital subtraction angiography (DSA) uses an injected contrast agent to visualize blood vessels and can be performed in the interventional suite. However, the 2D DSA image does not provide quantitative information nor a complete picture of the complex three-dimensional (3D) vascular structures.

Quantitative DSA (qDSA) and "4D" DSA have previously been proposed as non-invasive methods to determine blood flow and velocity intraprocedurally. While quantitative 2D DSA does not provide information on true 3D vessel path lengths and cross-sectional parameters which are required for accurate velocity and flow calculation, it can provide relative velocity measurements. Alternatively, vessel path length and cross-sectional area can be gathered through additional 3D DSA acquisitions. Both methods rely on contrast-enhanced image sequences, where information on blood velocity can be inferred from dynamic contrast changes in the vessels of interest. Generally, the dynamic information is extracted in form of time-attenuation curves (TACs) describing the change in signal at one location over time. In the case of qDSA, 2D DSA sequences are used where TACs are extracted by interpolating the value of a selected point in the image in each image frame. Thus, qDSA has inherent limitations in its ability to accurately quantify flow. The 4D DSA approach uses a rotational acquisition, where each projection image is acquired from a different orientation enabling the 3D reconstruction of the vessel anatomy. The dynamic information is then extracted by back-projecting each 2D image into the 3D space of the sparse vessel anatomy. Likewise, 4D DSA has inherent limitations in providing accurate quantitative information. Furthermore, 4D DSA can be limited in some clinical applications by the requirement for two separate rotational C-arm sweeps, which necessitates acquisition times sufficient to complete both sweeps and the radiation exposure associated with two sweeps. Similarly, qDSA requires the acquisition of long x-ray sequences to capture the dynamic information, which prompts the use of low dose acquisition protocols with higher image noise.

As stated, both qDSA and 4D DSA have inherent limitations with providing accurate flow information, including velocity. Blood velocity can be determined by comparing the TACs at different points along a vessel centerline. A shifted least-squared approach can be used to estimate the time shift between each pair of TACs for a given centerline using an iterative approach, which minimizes the mean squared error to arrive at an estimated time shift. A linear function is then fit to predict the temporal shift based on the distance between the pair of points. The inverse slope then represents an estimate of the velocity in the vessel segment between the two points. A similar approach, using the cross-correlation to align TACs has also been proposed. Alternatively, phase shifts in periodic bolus curves can be used instead of time shifts.

Unfortunately, both of these approaches rely on individual processing of point pairs, which usually results in larger errors for pairs with smaller distances between points and is more sensitive to image noise. Additionally, these approaches can be sensitive to bolus dispersion, where the shape of TACs changes along the vessel centerline. Finally, the iterative fitting and alignment may cause inaccuracies due to local minima.

Another group of approaches uses Indicator-dilution theory to determine flow and velocity in a volume of interest. However, these approaches generally require knowledge about the exact amount of injected contrast, are not well suited for cases with oscillating signal, and require conversion of density to contrast material concentration, which can lead to inaccuracies.

Therefore, it would be desirable to have systems and methods for generating quantitative flow information, including accurate and consistent quantified velocity information, to guide medical decisions, including in an interventional setting.

SUMMARY

The present disclosure overcomes the aforementioned drawbacks by providing systems and methods for delivering quantitative flow or velocity information, including in the presence of pulsatile flow and oscillating signal caused by contrast moving with the pulsatile or other time-varying flow. Such quantitative flow or velocity information, including velocity, can be provided using the systems and methods of the present disclosure without requiring iterative processing. In one non-limiting example, velocity quantification can be provided for contrast enhanced x-ray sequences with oscillating signal (e.g., caused by pulsatile flow) in the spatiotemporal frequency domain using a single step algorithm (non-iterative) process. Information from a variety of time-attenuation curves along a vessel centerline can be utilized together, including simultaneously.

In accordance with one aspect of the present disclosure, a system is provided for generating images quantifying flow or velocity within a vessel of a subject. The system includes an x-ray imaging system configured to acquire x-ray data from the subject while a contrast agent is delivered to the vessel of the subject and a computer system. The computer system is configured to generate time-attenuation curves for the vessel using the x-ray data, identify a plurality of points within the vessel and extending along a lumen of the vessel, and sample the time-attenuation curves at the plurality of points to generate a time-attenuation map. The computer system is further configured to perform a frequency domain transform on the time-attenuation map to generate a spatio-temporal map of spatial frequency versus temporal frequency, identify a peak frequency in the spatio-temporal map corresponding to flow or velocity in the vessel, quantify the flow or velocity within the vessel of the subject using the peak frequency, and generate a report indicating quantified flow or velocity through the vessel.

In accordance with another aspect of the present disclosure, a method is provided for generating images quantifying flow or velocity within a vessel of a subject. The method includes acquiring or accessing x-ray data of a subject experiencing a delivery of a contrast agent to the vessel of the subject and generating time-attenuation curves for the vessel using the x-ray data. The method also includes identifying a plurality of points within the vessel and extending along a lumen of the vessel and sampling the time-attenuation curves at the plurality of points to generate a time-attenuation map. The method further includes performing a frequency domain transform on the time-attenuation map to generate a spatio-temporal map of spatial frequency versus temporal frequency and identifying a peak frequency in the spatio-temporal map corresponding to flow or velocity in the vessel. The method then includes quantifying the flow or velocity within the vessel of the subject using the peak frequency and generating a report including quantified flow or velocity through the vessel.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Figure 1A:
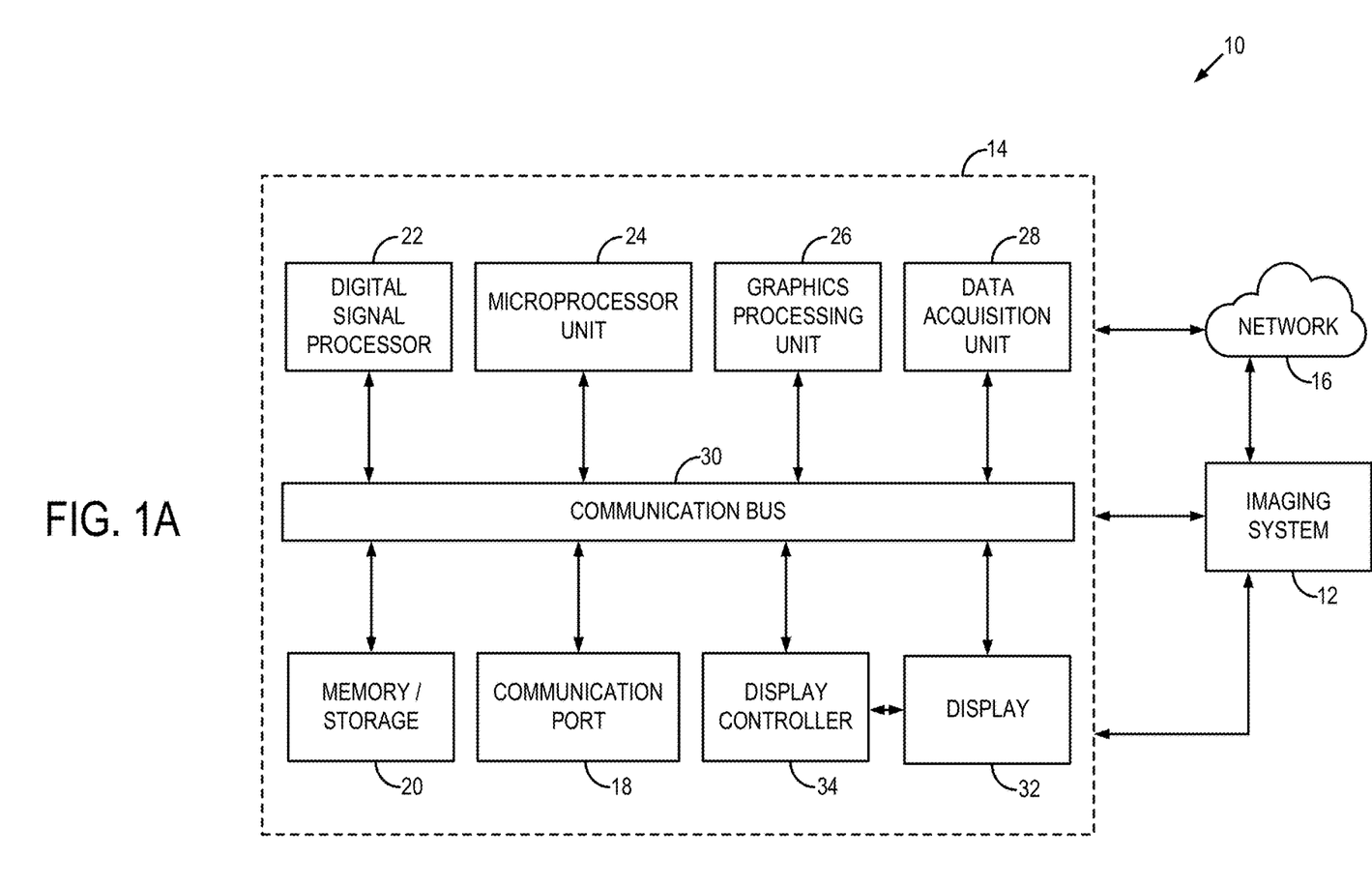
FIG. 1A is a schematic diagram of an example system in accordance with the present disclosure and that can be configured to implement the methods described herein.

Referring now to FIG. 1A, a block diagram of an example system 10 is provided that can be configured to carry out techniques, methods, and processes in accordance with the present disclosure. The system may include an imaging system 12 that is coupled to a computer system 14. The coupling of the imaging system 12 to the computer system 14 may be a direct or dedicated network connection, or may be through a broad network 16, such as an intranet or the Internet.

The computer system 14 may be a workstation integrated with or separate from the medical imaging systems 12 or a variety of other medical imaging systems, including, as non-limiting examples, either gantry-based x-ray, C-arm computed tomography (CT) systems, and the like. X-ray data or x-ray dataset may refer to any data or dataset acquired using x-rays or similar radiation, including "x-ray" system and "CT" systems. The CT system can be configured to utilize a fan or cone beam or other beam geometry. Relatedly, "x-ray data" or "CT data" may refer to 2D data or 3D data, or the like. As used herein "x-ray," "x-ray data, "x-ray dataset," "CT," "CT data," or "CT dataset" can be used in reference to any of these systems, acquisition implementations, or data unless specifying otherwise.

The computer system 14 may be a workstation integrated within the medical imaging system 12 or may be a separate workstation or mobile device or computing system. To this end, the following description of particular hardware and configurations of the hardware of the example computer system 14 is for illustrative purposes. Some computer systems may have varied, combined, or different hardware configurations, and may include commercially-available computer systems or specialized computer systems.

Medical imaging data acquired by the medical imaging system 12 or other imaging system and can be provided to the computer system 14, such as over the network 16 or from a storage device. To this end, the computer system 14 may include a communications port or other input port 18 for communication with the network 16 and system coupled thereto. Also, the computer system 14 may include memory and storage capacity 20 to store and access data or images.

In some configuration, computer system 14 may include one or more processing systems or subsystems. That is, the computer system 14 may include one or more physical or virtual processors. As an example, the computer system 14 may include one or more of a digital signal processor (DSP) 22, a microprocessor unit (MPU) 24, and a graphics processing unit (GPU) 26 (or other processors, such as field programmable gate arrays (FPGAs)). If the computer system 14 is integrated into the medical imaging system, a data acquisition unit 28 may be connected directly to the above-described processor(s) 22, 24, 26 over a communications bus 30, instead of communicating acquired data or images via the network 16. As an example, the communication bus 30 can be a group of wires, or hardwire used for switching data between the peripherals or between any components, such as the communication buses described above.

The computer system 14 may also include or be connected to a display 32. To this end, the computer system 14 may include a display controller 34. The display 32 may be a monitor connected to the computer system 14 or may be integrated with the computer system 14, such as in portable computers or mobile devices.

Figure 1B:
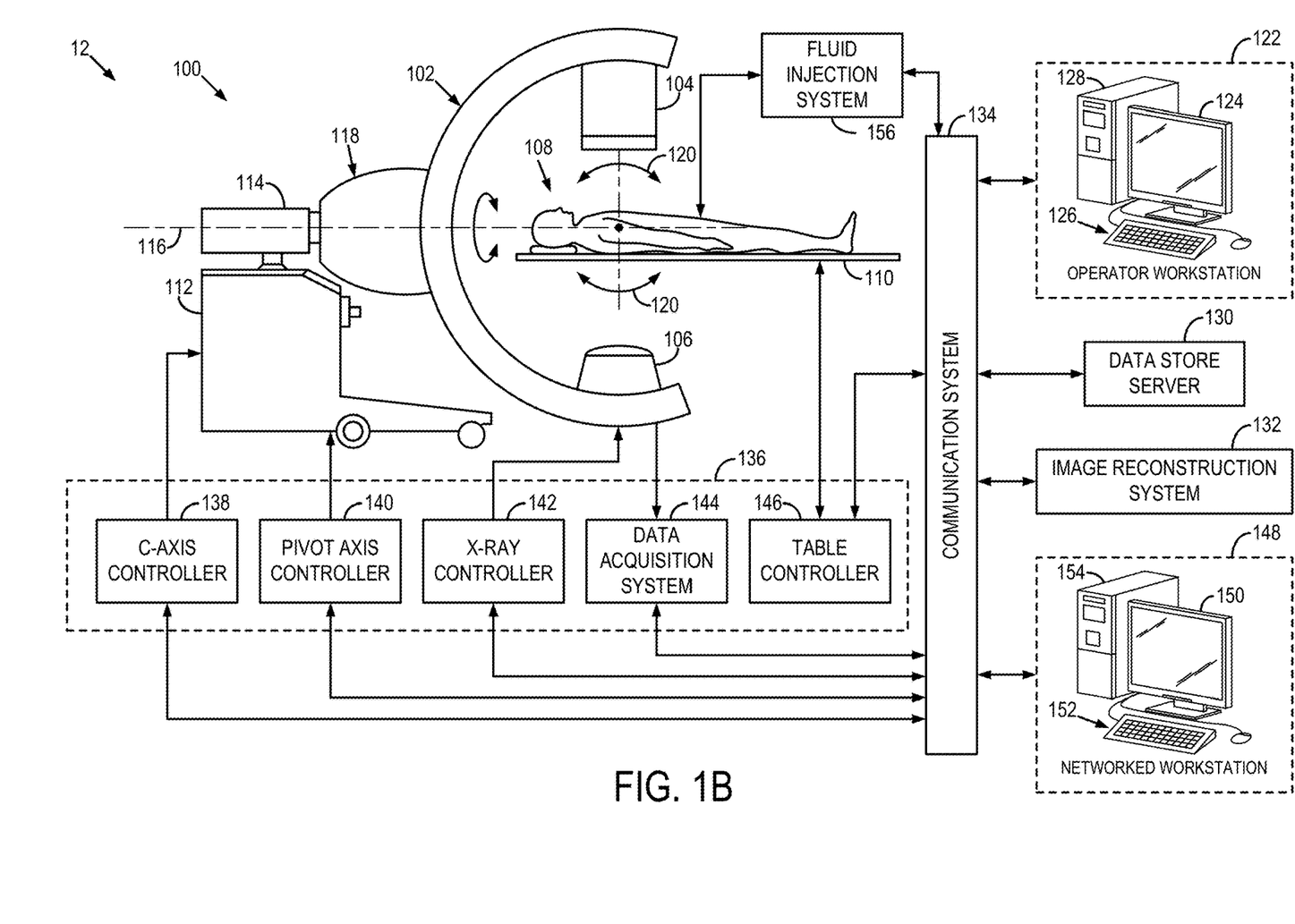
FIG. 1B is a schematic diagram of an x-ray computed tomography (CT) imaging system that can be configured in accordance with the present disclosure.

Referring to FIG. 1B, one, non-limiting example of the imaging system 12 is provided. Specifically, in this example, a so-called "C-arm" x-ray imaging system 100 is illustrated for use in accordance with some aspects of the present disclosure. However, the systems and methods provided herein are not limited to a particular structure or architecture of x-ray imaging system. That is, in the illustrated configuration, the imaging system 12 is generally designed for use in connection with interventional procedures. However, non-interventional systems, such as "closed" systems may also be used with the systems and methods described herein.

Thus, in the non-limiting example illustrated in FIG. 1B, the imaging system 12 forms a C-arm CT imaging system 100 that includes a gantry 102 to which an x-ray source assembly 104 is coupled on one end and an x-ray detector array assembly 106 is coupled at its other end. The gantry 102 enables the x-ray source assembly 104 and detector array assembly 106 to be oriented in different positions and angles around a subject 108, such as a medical patient or an object undergoing examination, which is positioned on a table 110. When the subject 108 is a medical patient, this configuration enables a physician access to the subject 108.

The x-ray source assembly 104 includes at least one x-ray source that projects an x-ray beam, which may be a beam, fan-beam, or cone-beam of x-rays, towards the x-ray detector array assembly 106 on the opposite side of the gantry 102. The x-ray detector array assembly 106 includes at least one x-ray detector, which may include a number of x-ray detector elements. Examples of x-ray detectors that may be included in the x-ray detector array assembly 106 include flat panel detectors, such as so-called "small flat panel" detectors.

Together, the x-ray detector elements in the one or more x-ray detectors housed in the x-ray detector array assembly 106 sense the projected x-rays that pass through a subject 108. Each x-ray detector element produces an electrical signal that may represent the intensity of an impinging x-ray beam and, thus, the attenuation of the x-ray beam as it passes through the subject 108. In some configurations, each x-ray detector element is capable of counting the number of x-ray photons that impinge upon the detector. During a scan to acquire x-ray projection data, the gantry 102 and the components mounted thereon may rotate about an isocenter of the C-arm x-ray imaging system 100.

The gantry 102 includes a support base 112. A support arm 114 is rotatably fastened to the support base 112 for rotation about a horizontal pivot axis 116. The pivot axis 116 is aligned with the centerline of the table 110 and the support arm 114 extends radially outward from the pivot axis 116 to support a drive assembly 118 on its outer end. The gantry 102 is fastened to the drive assembly 118 and is coupled to a drive motor (not shown) that slides the gantry 102 to revolve it about a C-axis, as indicated by arrows 120. The pivot axis 116 and C-axis are orthogonal and intersect each other at the isocenter of the x-ray imaging system 100, which is indicated by the black circle and is located above the table 110.

The x-ray source assembly 104 and x-ray detector array assembly 106 extend radially inward to the pivot axis 116 such that the center ray of this x-ray beam passes through the system isocenter. The center ray of the x-ray beam can thus be rotated about the system isocenter around either the pivot axis 116, the C-axis, or both during the acquisition of x-ray attenuation data from a subject 108 placed on the table 110. During a scan, the x-ray source and detector array may be rotated about the system isocenter to acquire x-ray attenuation projection data from different angles. The imaging system 12 may include or be used with a fluid injection system 156. The fluid injection system 156 may deliver a fluid, such as a contrast agent, to the subject during the imaging acquisition The x-ray imaging system 100 also includes an operator workstation 122, which typically includes a display 124, one or more input devices 126, such as a keyboard and mouse; and a computer processor 128. The computer processor 128 may include a commercially available programmable machine running a commercially available operating system. The operator workstation 122 provides the operator interface that enables scanning control parameters to be entered into the C-arm x-ray imaging system 100. In general, the operator workstation 122 is in communication with a data store server 130 and an image reconstruction system 132. By way of example, the operator workstation 122, data store server 130, and image reconstruction system 132 may be connected via a communication system 134, which may include any suitable network connection, whether wired, wireless, or a combination of both. As an example, the communication system 134 may include both proprietary or dedicated networks, as well as open networks, such as the internet.

The operator workstation 122 is also in communication with a control system 136 that controls operation of the x-ray imaging system 100. The control system 136 generally includes a C-axis controller 138, a pivot axis controller 140, an x-ray controller 142, a data acquisition system ("DAS") 144, and a table controller 146. The x-ray controller 142 provides power and timing signals to the x-ray source assembly 104, and the table controller 146 is operable to move the table 110 to different positions and orientations within the x-ray imaging system 100.

The rotation of the gantry 102 to which the x-ray source assembly 104 and the x-ray detector array assembly 106 are coupled is controlled by the C-axis controller 138 and the pivot axis controller 140, which respectively control the rotation of the gantry 102 about the C-axis and the pivot axis 116. In response to motion commands from the operator workstation 122, the C-axis controller 138 and the pivot axis controller 140 provide power to motors in the C-arm x-ray imaging system 100 that produce the rotations about the C-axis and the pivot axis 116, respectively. For example, a program executed by the operator workstation 122 generates motion commands to the C-axis controller 138 and pivot axis controller 140 to move the gantry 102, and thereby the x-ray source assembly 104 and x-ray detector array assembly 106, in a prescribed scan path.

The DAS 144 samples data from the one or more x-ray detectors in the x-ray detector array assembly 106 and converts the data to digital signals for subsequent processing. For instance, digitized x-ray data is communicated from the DAS 144 to the data store server 130. The image reconstruction system 132 then retrieves the x-ray data from the data store server 130 and reconstructs an image therefrom. The image reconstruction system 130 may include a commercially available computer processor, or may be a highly parallel computer architecture, such as a system that includes multiple-core processors and massively parallel, high-density computing devices. Optionally, image reconstruction can also be performed on the processor 128 in the operator workstation 122. Reconstructed images can then be communicated back to the data store server 130 for storage or to the operator workstation 122 to be displayed to the operator or clinician.

The x-ray imaging system 100 may also include one or more networked workstations 148. By way of example, a networked workstation 148 may include a display 150; one or more input devices 152, such as a keyboard and mouse; and a processor 154. The networked workstation 148 may be located within the same facility as the operator workstation 122, or in a different facility, such as a different healthcare institution or clinic.

The networked workstation 148, whether within the same facility or in a different facility as the operator workstation 122, may gain remote access to the data store server 130, the image reconstruction system 132, or both via the communication system 134. Accordingly, multiple networked workstations 148 may have access to the data store server 130, the image reconstruction system 132, or both. In this manner, x-ray data, reconstructed images, or other data may be exchanged between the data store server 130, the image reconstruction system 132, and the networked workstations 148, such that the data or images may be remotely processed by the networked workstation 148. This data may be exchanged in any suitable format, such as in accordance with the transmission control protocol ("TCP"), the Internet protocol ("IP"), or other known or suitable protocols.

As will be described, the systems and methods of the present disclosure are particularly useful in a variety of different clinical settings. For example, liver embolization (e.g., transarterial chemoembolization (TACE)) is an effective, minimally invasive treatment option for patients with intermediate or advanced cancer (e.g., hepatocellular carcinoma (HCC)) and select patients with liver metastases. Angiographic monitoring of residual blood flow to treated tumors at the time of the procedure is important to the success of the procedure and impacts outcomes. However, outcomes are tied to good visualization of eliminating blood flow to the tumor using angiography. While efforts have been made to standardize the angiographic endpoint for liver embolization, it remains largely subjective and is not reproducible. In particular, perfusion and patency of the tumor microvasculature depend on the degree of stasis (or reduced blood flow) achieved on angiography.

As will be described, the present disclosure provides systems and methods that can use x-ray image sequences performed when the subject is experiencing an injection of contrast agent to quantify the blood flow or velocity along vessels. The pulsatile blood flow in arteries generates periodic changes in contrast (oscillating signal), which can be used for tracking the movement of contrast over time. A preprocessing step can be used to extract the dynamic contrast signal from the x-ray sequences to generate time attenuation curves for each point in a vessel. Flow quantification, including velocity quantification, can then performed based on an analysis of spatiotemporal frequencies.

Figure 2:
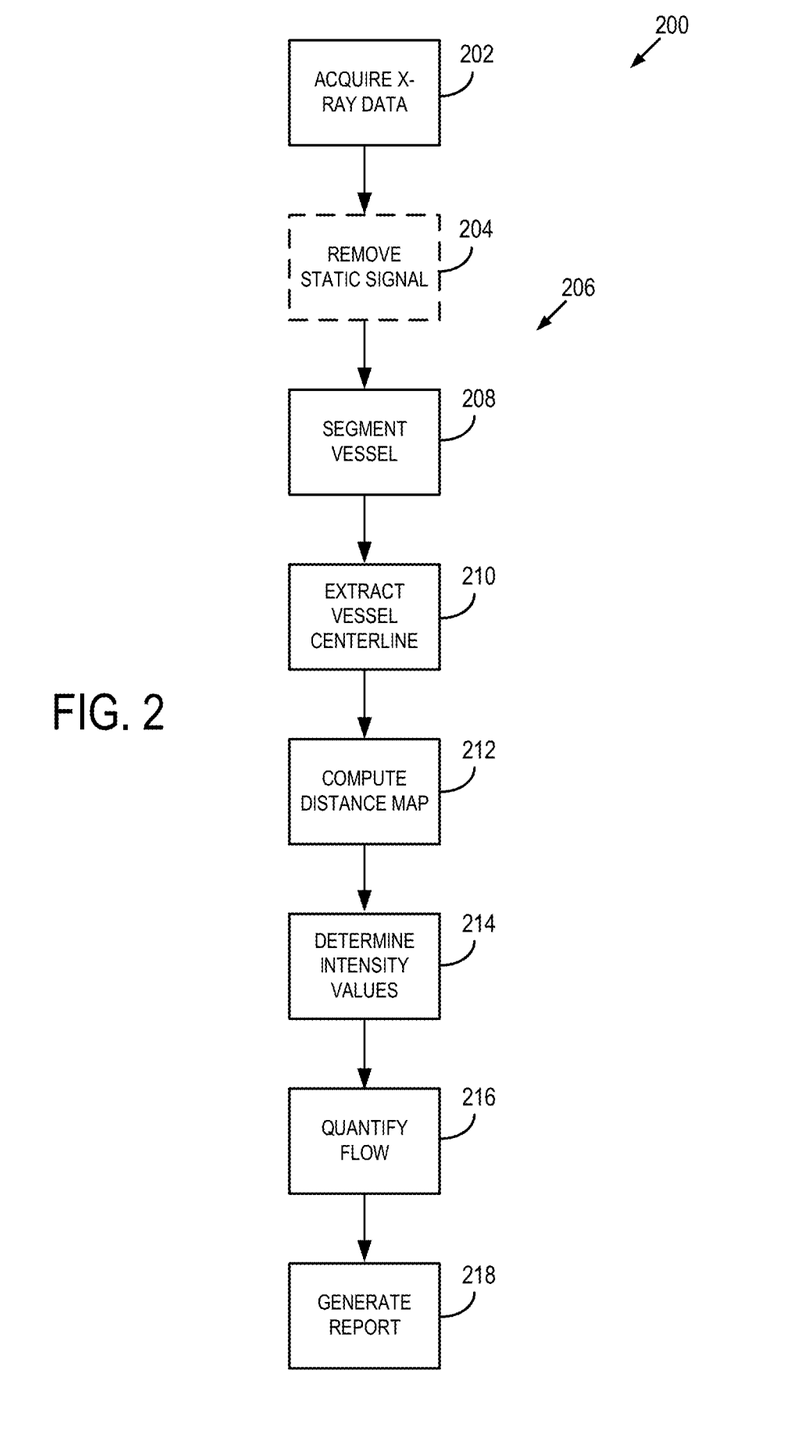
FIG. 2 is a process diagram for a non-limiting example of a process in accordance with the present disclosure for generating reports quantifying flow or velocity through a vessel.

Referring now to FIG. 2, a process diagram is provided for a process 200 in accordance with the present disclosure. The process includes acquiring imaging data at process block 202. In one non limiting example, the imaging data may be acquired using an x-ray system, such may include a rotational C-arm CT system. Thus, a contrast enhanced x-ray sequence (either 2D or rotational 3D acquisition) may be performed or such data may be accessed after having been previously acquired. The data acquisition at process block 202 may be performed while the patient is receiving a contrast injection. However, as will be described, a non-contrast x-ray image frame may be acquired. Thus, process block 202 may include acquiring non-contrast x-ray data and contrast-enhanced x-ray data.

Thus, at process block 204, static signal may be removed. This can be done with any of a variety of processes provided herein. In a first option, the non-contrast x-ray image frame may be subtracted from each contrast enhanced image to remove static signal. However, this subtraction may cause artifacts in cases with motion or overlap between different vessels. In the limited circumstances of the latter case, the dynamic signal from two different vessels may interfere and affect velocity quantification.

As such, instead of a mask subtraction at process block 204, a second option may be performed at process block 204. In particular, each pair of immediately adjacent x-ray images in the sequence may be subtracted resulting in peaks near the leading and trailing edge of each oscillation of signal. Since the time between adjacent image frames is small, little motion will be present. Additionally, the risk of observing overlapping signal from two different vessels is reduced because accumulating contrast in the vessels is subtracted and signal is only observed around the edges of each contrast oscillation.

As a third option at process block 204, the native x-ray images may be utilized without subtraction. Rather, a frequency analysis, as will be described may be used to distinguish between dynamic and static signal. In this third option, process block 204 may be skipped and, thus, is indicated as "optional." Likewise, as indicated above, the acquisition of the non-contrast x-ray data at process block 202 may be optional.

Figure 3A:
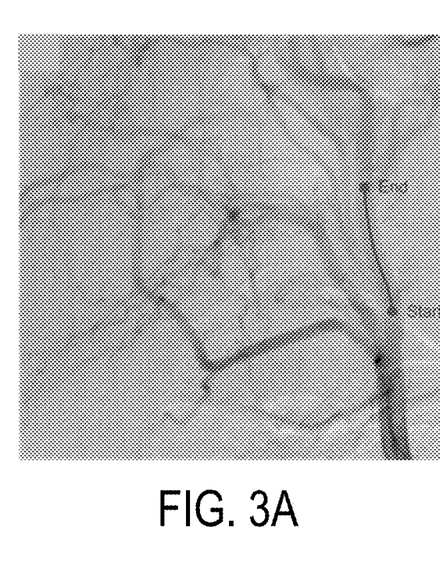
FIG. 3A is a non-limiting example image showing an annotated centerline with user selected start and end point on subtracted x-ray frame.

At 206, a sub-process begins for computing time-attenuation maps (TAM) for the vessels of interest in the x-ray images. At process block 208, the vessel is then segmented. At process block 208, a vessel centerline can be extracted. For example, the centerline can be extracted by manually placing start and end points, or by using automated algorithms to extract the centerline, including machine-learning methods. One example of an annotated centerline with start and end points shown on a subtracted x-ray image frame is shown in FIG. 3A.

In the cases of 4D DSA, the centerline can be determined in a 3D reconstruction of the vasculature and subsequently forward projected into each 2D image plane. Time-attenuation or time-signal curves can then be generated for every point of the centerline by interpolating the intensity of the corresponding point in the 2D image. The time attenuation curves are then combined.

For example, a threshold-based approach can be used. A distance map, D, can be computed at process block 212. In one non-limiting example, in the distance map, each pixel can represent the Euclidean distance to the closest non-vessel pixel. Using Dykstra's algorithm, the centerline can be extracted by determining the path $P=[p_1, p_2, \ldots, p_n]$ from start to end point which minimizes a function. For example, the function may be:

$$\text{cost}(P) = -\sum_{i=1}^{n} D(p_i)^2. \quad \text{Eqn. (1)}$$

Figure 3B:
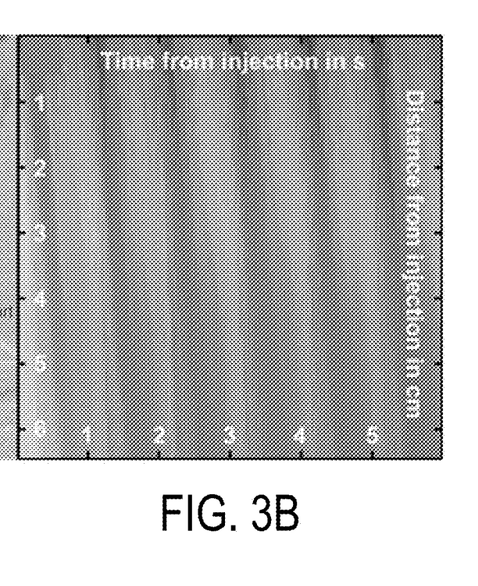
FIG. 3B is a non-limiting example of a time attenuation map in accordance with the present disclosure showing periodic contrast changes along the time axis at approximately 1 Hz with increasing shift with distance to the injection site.

Next, flow or velocity quantification can be performed. At process block 214, intensity values can be determined, for example, at a variety of sample points along the centerline. For example, the points may be equidistant points. For each point, the intensity value in each x-ray image frame can be determined resulting in a 2D map, where the x- and y-axes represent time and distance from the start point respectively and the pixel value is the corresponding contrast signal. FIG. 3B shows an example of a TAM created for the vessel of FIG. 3A. FIG. 3B shows periodic contrast changes along the time axis at approximately 1 Hz with increasing shift with distance to the injection site (shear). Thus, as can be seen in the non-limiting example illustrated in FIG. 3B, the individual contrast oscillations are visible in the TAM as periodical intensity variations along the temporal axis.

With the intensity values determined, at process block 216, the quantified flow or velocity information can be determined. Let $f(x, y)$ be the 2-dimensional function representing the TAM with x being the time from the start of the contrast injection in seconds and y the distance from the start point in cm. The corresponding 2D Fourier space represents a spatio-temporal map that can be represented by function $F(u, v)$ with:

$$F(u, v) = \iint_{-\infty}^{\infty} f(x, y) e^{-i2\pi(ux+vy)} dx dy. \quad \text{Eqn. (2)}$$

Based on the Fourier theorem, a periodic function that satisfies the Dirichlet conditions can be represented by a linear combination of harmonic sinusoidal functions. In the frequency space, this can be represented by a series of Dirac delta functions at the fundamental and harmonic frequencies. Assuming the periodic pattern is parallel to the spatial axis, the peaks are located at v=0 and u=λω, where λ is an integer and a is the fundamental frequency of the periodic signal.

Since, for any finite blood velocity, the time of arrival of a contrast bolus at each point in the vessel is dependent on the distance Δd from the start point, the intensity variations are shifted by a time Δt for more distal points, creating a shear in the periodic pattern. The shear angle, α, is directly related to the velocity v, where:

$$\overline{v} = \frac{\Delta d}{\Delta t} = \cot(\alpha). \quad \text{Eqn. (3)}$$

The shear operation along the temporal direction can be written as:

$$x' = x + \tan(\alpha)y; \text{ and} \quad \text{Eqn. (4)}$$

$$y' = y. \quad \text{Eqn. (5)}$$

In the frequency domain this transformation is manifested as an inverse shear along the spatial frequency direction, which can be shown using the substitution method. For example, if F'(u, v) is the 2D Fourier transform (or other suitable frequency domain transform) of the sheared function, $f(x+\tan(\alpha)y, y)$, then:

$$\begin{aligned} F'(u, v) &= \iint_{-\infty}^{\infty} f(x + \tan(\alpha)y, y) e^{-i2\pi(ux+vy)} dx dy \\ &= \iint_{-\infty}^{\infty} f(x', y') e^{-i2\pi(u(x'-\tan(\alpha)y)+vy')} |J| dx' dy' \\ &= \iint_{-\infty}^{\infty} f(x', y') e^{-i2\pi(ux'+(v-\tan(\alpha)u)y')} dx' dy' \\ &= F(u, v - \tan(\alpha)u) \end{aligned} \quad \text{Eqn. (6)}$$

where |J|=1 is the determinant of the Jacobian matrix of the shear operation. Thus, the shear angle and, therefore, the blood velocity can be determined based on the location of the fundamental frequency peak $(u_\omega, v_\omega) = (\omega, -\tan(\alpha)\omega)$ in the 2D Fourier space of the spatio-temporal map using:

$$\overline{v} = \cot(\alpha) = \frac{1}{\tan(\alpha)} = -\frac{u_\omega}{v_\omega}. \quad \text{Eqn. (7)}$$

Figure 4:
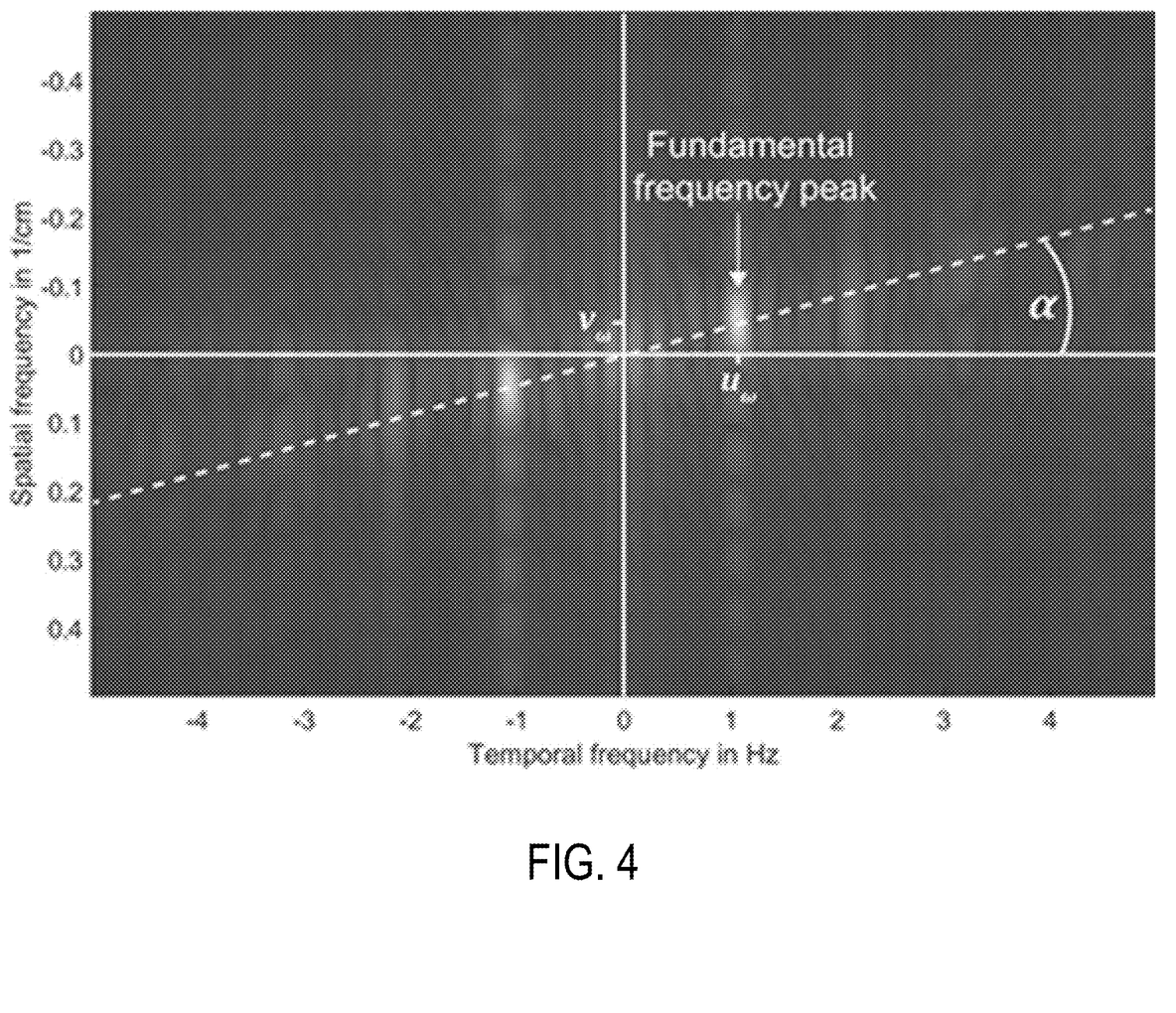
FIG. 4 is a graph showing a non-limiting example of a 2D Fourier transform of a time attenuation map.

FIG. 4 shows the 2D Fourier transform (absolute values) of the time attenuation curve with shear angle α and fundamental frequency peak at $(u_\omega, v_\omega)$. To identify the fundamental frequency peak location, the 2D power spectrum $PS(f)=|F(u, v)|^2$ can be calculated for the TAM using the 2-dimensional fast Fourier transform (FFT) or other suitable domain transform. Prior to applying the FFT, the global mean of the TAM can be subtracted to remove the constant offset and zero padding was used to decrease the spacing between frequencies. The location corresponding to the maximum value in the power spectrum can then be used as fundamental frequency peak.

Thus, referring again to FIG. 2 along with FIG. 4, the velocity can be calculated as the tangent of the angle between the x-axis and the line connecting the center of the 2D Fourier spectrum to the center of the peak. In other words, if the center of the peak is located at spatial frequency Fs and temporal frequency Ft, the velocity is given by v=Ft/Fs. The above-described velocity estimation approach can use a 2D Fourier transform to calculate the velocity of contrast moving through a vessel of interest in a single step (without pairwise comparisons between different points along the centerline) and non-iteratively. Using all (or a desired amount of) data in a single step improves the robustness of the approach with respect to noise and artifacts.

At process block 218, a report can be generated that includes quantified flow information, or velocity information. The report may take any of a variety of forms, including anatomical images with graphical overlays that illustrate the quantitative information, such as via color coding. Alternatively, the report may be a text or index-based report, such that the clinician is given a specific quantified value, which may be an absolute value or a number relative to a reference index.

Figure 5A:
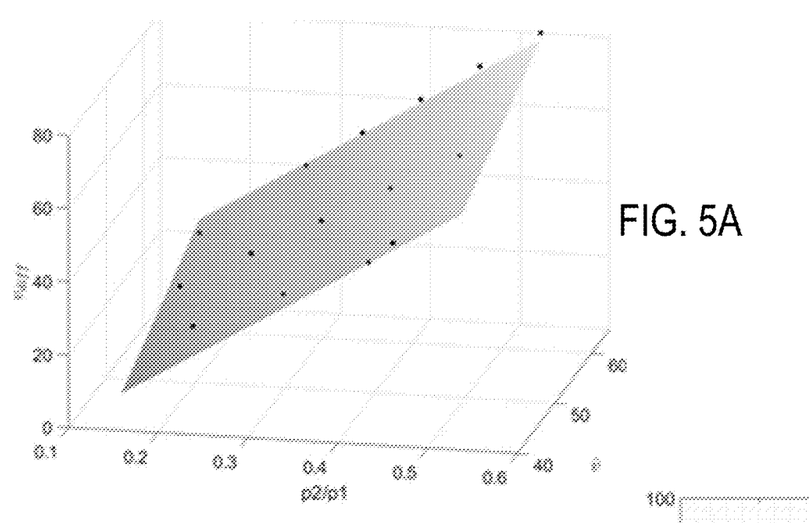
FIG. 5A is a graph showing an example of a fit of linear model to CFD simulation results.
Figure 5B:
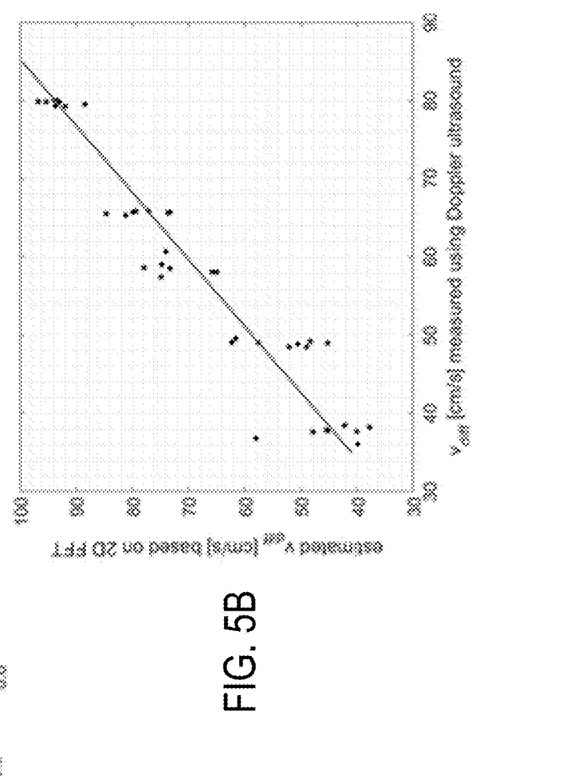
FIG. 5B is a graph showing a comparison of Doppler ultrasound measurements of the velocity in a straight tube model compared to velocity estimated from x-ray acquisitions with 2D FFT analysis.

The above-described systems and methods were described relative to a non-limiting example of quantitative flow or velocity analysis applied to determining the average velocity over time in a vessel or vessel segment. In some cases, it may be desirable for the report produced at block 218 to include other quantitative information. For example, the report may include information regarding the change in velocity between systole and diastole. This change in velocity is responsible for the oscillating signal measured in the time attenuation curves. This oscillating signal is strongest near the injection site and is then slowly reduced with the distance due to the dispersion of contrast. In the 2D Fourier transform, the relative intensity of the harmonic peaks can be used to describe the dispersion and the change in velocity over time ($v_{diff}=v_{max}-v_{min}$). To evaluate this concept, a model describing the relationship between $v_{diff}$ and the intensities of the harmonic peaks was determined in a series of computational fluid dynamics (CFD) simulations and subsequently tested in real-world phantom studies. The CFD simulations revealed a linear relationship, which can be described by:

$$v_{diff} = \alpha \cdot \frac{p_2}{p_1} + \beta \cdot \hat{v} + \gamma \cdot d + \delta; \qquad \text{Eqn. (8)}$$

where $\alpha$, $\beta$, $\gamma$, and $\delta$ are the calculated parameters of the model, $p_1$ and $p_2$ are the intensities of the first and second harmonic peak, respectively, and d is the distance from the injection site to the center of the measured centerline. However, even without knowing d, a relative estimation of $v_{diff}$ is possible. This model was confirmed in a straight tube phantom experiment. FIG. 5A shows the fit of the linear model to the CFD simulation results (without d) and FIG. 5B shows a comparison between the estimated and actual $v_{diff}$ in the phantom model (Slope=1.1, Intercept=0.1).

EXAMPLES

A phantom study was performed to evaluate the accuracy of the above-described velocity-quantification approach. The phantom setup includes a straight PVC tube (6.35 mm diameter) representing the vessel of interest, which was connected to a pulsatile flow pump (BDC Laboratories, Wheat Ride, CO). A Y-adapter for contrast injection was placed between the tube and pump, where a 5 Fr flush tipped injection catheter was inserted into the straight tube. Contrast injection was performed using a Nemoto Press Duo power injector (Nemoto Kyorindo, Bunkyo-ku, Tokyo) with a flow rate of 2.0 ml/s for 7.0 s. The end of the straight tube and the input to the pulsatile pump were connected to a reservoir containing blood mimicking fluid (60-40 water-glycerol mix by volume). Reference flow measurements were performed with an external doppler ultrasound probe (H7XL Transonic, Ithaca, NY) placed around the straight tube approximately 40 cm after the injection site. A biplane angiography system (Artis zee, Siemens Healthineers, Forchheim, Germany) was used to acquire x-ray image sequences. The pump settings were adjusted to provide velocities between 20 and 40 cm/s (without contrast injection) in intervals of 5 cm/s as measured with the reference ultrasound probes in the straight tube. During contrast injection a slight increase in velocity was observed in each case. Image sequences were acquired at 3 dose levels (11.3 mGy/s, 3.6 mGy/s, 1.3 mGy/s) for each velocity with a frame rate of 25 frames per second, isotropic pixel size of 0.308 mm, and source detector distance of 120 cm. The tube was positioned along the rotation axis of the C-arm approximately at isocenter resulting in a magnification factor of ~1.6 at the detector.

The x-ray image data for all cases were preprocessed using each of the three aforementioned subtraction approaches and the corresponding TAMs and velocities calculated using the spatiotemporal frequency domain (STF) approach. The results were compared to reference measurements from doppler ultrasound. Additionally, velocities were calculated using previously published techniques including least squared fit (LSF) and phase shift (PHS) for comparison. Accuracy for each x-ray-based approach was assessed by comparison to the reference measurements using the signed percent difference:

$$err = \frac{v_{xray} - v_{ref}}{v_{ref}} \times 100\%; \qquad \text{Eqn. (9)}$$

where $v_{xray}$ and $v_{ref}$ are the velocities determined using x-ray and doppler ultrasound respectively. Additionally, a linear regression analysis was performed by estimating slope a and intercept b for:

$$v_{xray} = av_{ref} + b; \qquad \text{Eqn. (10)}$$

using singular value decomposition (SVD). R-squared was reported to assess goodness of fit for all regression models.

Figure 6:
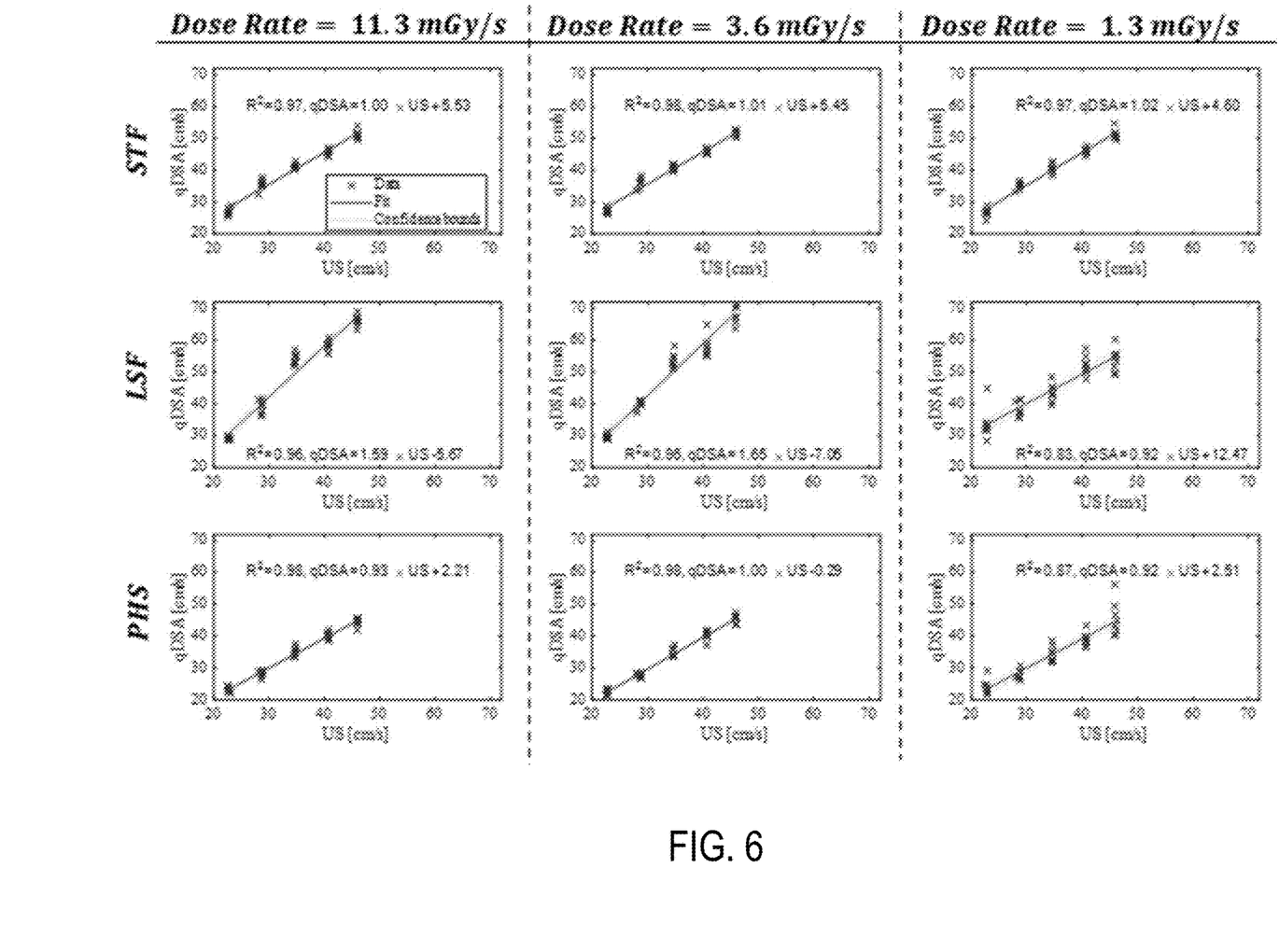
FIG. 6 is a set of graphs comparing the measured qDSA velocity results for three approaches (spatio-temporal frequency domain approach (STF), least squares fit (LSF), and phase shift (PHS)) compared to the reference velocities measured using the ultrasound probe

FIG. 6 is a set of graphs that show the measured qDSA velocity results for the phantom study for all three approaches (STF, LSF, and PHS) compared to the reference velocities measured using the ultrasound probe. The slope of the linear regression model for the proposed STF approach was 1.00, 1.01, and 1.02 for the three dose levels, respectively ($R^2 \geq 0.97$). For the LSF and PHS approach, larger differences were observed between the different dose levels, where the slopes ranged between 0.92 and 1.65 and between 0.92 and 1.0, respectively.

Figure 7A:
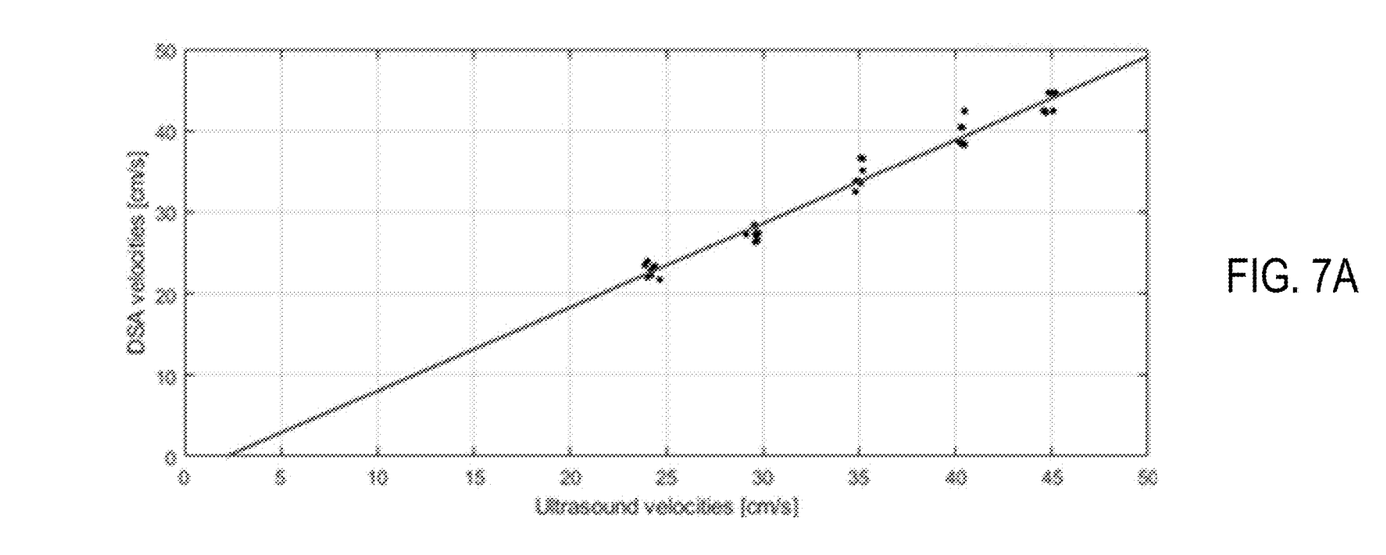
FIG. 7A is a graph showing a comparison between velocities calculated from conventional DSA sequences compared to an ultrasound reference.
Figure 7B:
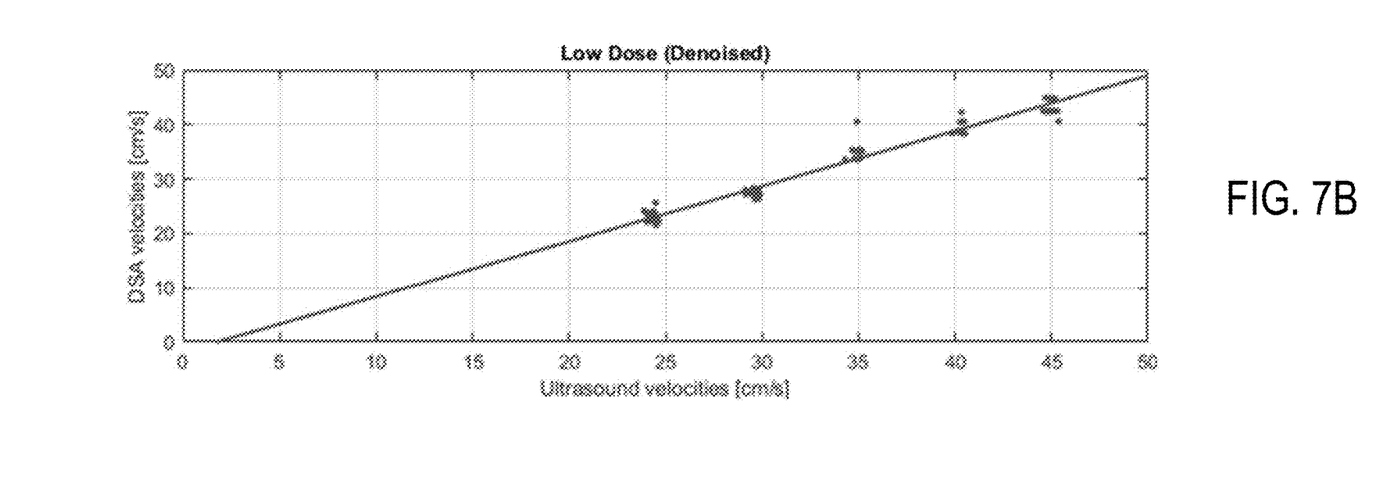
FIG. 7B is a graph showing a comparison between velocities calculated from low dose x-ray sequences after deep learning based denoising was applied compared to the ultrasound reference.

FIGS. 7A and 7B show a comparison between velocities calculated from DSA (high dose) to low dose x-ray acquisitions with and without denoising. A strong linear relationship was found with a slope of 1.02 and an intercept of −1.76 cm/s. Showing good correlation across dose levels.

Therefore, systems and methods have been provided, and demonstrated that, unlike previously-proposed approaches, provides a non-iterative, global solution, which does not rely on pairwise comparisons of time attenuation curves and are robust against noise. The systems and methods provided herein can use the 2D Fourier transform or other suitable transform to determine the orientation of waveforms in a 2D time-signal map (e.g. time-attenuation map). Assuming a series of x-ray images with contrast injection in the vessels of interest has been acquired, the systems and methods provided herein can use time-attenuation curves sampled along the vessel centerline to create a time attenuation map. The 2D Fourier transform of the time-attenuation map is then calculated, where one axis corresponds to frequencies in the time domain and another axis corresponds to frequencies in the spatial domain (distance along the centerline). The frequency amplitudes can be calculated by taking the absolute value of the complex Fourier coefficients. The oscillating signal caused by the contrast fluctuations due to the heartbeat creates peaks at the frequency corresponding to the heart rate and each harmonic frequency. If the oscillations in the time-attenuation map are oriented parallel to the time axis (infinite velocity) the corresponding peaks can be placed along the center of the Fourier transform (y=0). For lower velocities, the waveforms are sheared along the spatial axis. In these cases, the corresponding frequency peak is offset from the y-axis, where the distance is correlated to the amount of shear and, therefore, the velocity (velocity=y-offset/temporal frequency). In other words, the velocity can be determined by the tangent of the angle between the one axis and the line from the origin to the center of the peak. Additionally, the systems and methods provided herein provide velocity quantification in cases where no mask image is available. To this end, adjacent contrast enhanced projection images can be subtracted to create a visualization of the leading edge of the contrast.

Velocity calculation can be performed using time-signal maps calculated in the same way as time-attenuation maps. This approach provides several advantages over prior efforts. For example, no mask images are required, which provides for a potential dose reduction. Also, the systems and methods provided herein are less sensitive to motion than prior efforts at velocity quantification from x-ray data. Further, the systems and methods provided herein can yield a reduction of overlap artifacts since only a small portion of the image (around the leading edge of the contrast) is active in each frame.

Thus, systems and methods are provided that provide a global and non-iterative velocity quantification approach for oscillating signals (e.g. qDSA and 4D DSA). A preprocessing technique is also provided that allows one to sparsify the contrast signal and perform velocity quantification without mask, thereby, reducing the risk of artifacts due to motion or vessel overlaps.

The 2D Fourier transform-based velocity quantification approach has several advantages over previously-proposed methods (e.g. shifted least squares, cross correlation or phase shift methods). For example, the systems and methods provided herein can be implemented in a single-step approach instead of an iterative optimization. This reduces the risk of returning a local minimum rather than the global optimum and, therefore, increases robustness of the velocity estimation. Additionally, the systems and methods provided herein can be performed with reduced computation times, compared to iterative methods, for example. Also, the systems and methods provided herein can utilize data from all points simultaneously in a single step instead of pairwise comparisons between points on the centerline (as previous methods do). This increases robustness and sensitivity to noise. Further still, the systems and methods provided herein do not require optimization of internal parameters, which can affect the quality of the results. Also, the systems and methods provided herein are not as sensitive to varying hart rates (compared to the phase shift approach) since no phase information is used. The systems and methods provided herein can quantify bolus dispersion, which is related to the velocity changes between systolic and diastolic flow.

The systems and methods provided herein may be implemented as an external software package that can be run on an external workstation or even mobile computing device. Also, the systems and methods provided herein can be integrated with existing or new C-arm systems. In the case of an embolization procedure, acquisitions may be performed before, during, or after embolization. Data may be transferred to an external workstation where blood velocities are calculated and displayed immediately without interrupting the clinical workflow. Based on the resulting flow measurements additional embolization material may be injected until the desired endpoint is reached.

As used herein in the context of computer implementation, unless otherwise specified or limited, the terms "component," "system," "module," "controller," "framework," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, the phrase "at least one of A, B, and C" means at least one of A, at least one of B, and/or at least one of C, or any one of A, B, or C or combination of A, B, or C. A, B, and C are elements of a list, and A, B, and C may be anything contained in the Specification.

The present invention has been described in terms of one or more preferred embodiments, and it should be appreciated that many equivalents, alternatives, variations, and modifications, aside from those expressly stated, are possible and within the scope of the invention.

The invention claimed is:

1. A system for generating images quantifying flow or velocity within a vessel of a subject, the system comprising:
   an x-ray imaging system configured to acquire x-ray data from the subject while a contrast agent is delivered to the vessel of the subject, wherein the x-ray data includes a non-contrast x-ray image and at least one contrast enhanced image;
   a computer system configured to:
   subtract non-contrast x-ray data from the x-ray data to remove static;
   generate time-attenuation curves for the vessel using the subtracted x-ray data;

segment the vessel from the subtracted x-ray data;
identify a plurality of points within the segmented vessel and extending along a lumen of the vessel;
sample the time-attenuation curves at the plurality of points to generate a time-attenuation map;
perform a domain transform on the time-attenuation map to generate a spatio-temporal map of spatial frequency versus temporal frequency;
identify a peak frequency in the spatio-temporal map corresponding to flow or velocity in the vessel;
determine a tangent of an angle between a first axis and a line from an origin of the first axis and a second axis to the peak frequency in the spatio-temporal map corresponding to velocity;
quantify the flow or velocity within the segmented vessel of the subject using the peak frequency;
and generate a report indicating quantified flow or velocity through the vessel or the segmented vessel.

2. The system of claim 1, wherein a first axis of the spatio-temporal map corresponds to frequencies in the time domain and a second axis of the spatio-temporal map corresponds to frequencies in the spatial domain.

3. The system of claim 2, wherein the peak frequency in the spatio-temporal map corresponding to flow or velocity in the vessel is identified relative to the second axis.

4. The system of claim 1, wherein the computer system is further programmed to calculate frequency amplitudes in the spatio-temporal map by taking an absolute value of complex Fourier coefficients.

5. The system of claim 1, wherein the computer system is further programmed to subtract adjacent contrast enhanced projection data from the x-ray data before generating the time-attenuation curves for the vessel using the x-ray data.

6. The system of claim 1, wherein the x-ray data includes at least one of quantitative digital subtraction angiography data or four-dimensional digital subtraction angiography data.

7. The system of claim 1, wherein the computer system is further programmed to determine a centerline for the vessel and identify the plurality of points on the centerline.

8. The system of claim 7, wherein the plurality of points are uniformly distributed over the centerline.

9. A method for generating a report quantifying flow or velocity within a vessel of a subject, the method comprising:
acquiring or accessing x-ray data of a subject experiencing a delivery of a contrast agent to the vessel of the subject, wherein the x-ray data includes a non-contrast x-ray image and at least one contrast enhanced image;
subtract non-contrast x-ray data from the x-ray data to remove static;
generating time-attenuation curves for the vessel using the subtracted x-ray data;
segment the vessel from the subtracted x-ray data;
identifying a plurality of points within the vessel and extending along a lumen of the vessel;
sampling the time-attenuation curves at the plurality of points to generate a time-attenuation map;
performing a domain transform on the time-attenuation map to generate a spatio-temporal map of spatial frequency versus temporal frequency;
identifying a peak frequency in the spatio-temporal map corresponding to flow or velocity in the vessel;
determine a tangent of an angle between a first axis and a line from an origin of the first axis and a second axis to the peak frequency in the spatio-temporal map corresponding to velocity;
quantifying the flow or velocity within the vessel of the subject using the peak frequency;
and generating a report including quantified flow or velocity through the vessel or the segmented vessel.

10. The method of claim 9, wherein a first axis of the spatio-temporal map corresponds to frequencies in the time domain and a second axis of the spatio-temporal map corresponds to frequencies in the spatial domain.

11. The method of claim 10, wherein the peak frequency in the spatio-temporal map corresponding to flow or velocity in the vessel is identified relative to the second axis.

12. The method of claim 9, further comprising calculating frequency amplitudes in the spatio-temporal map by taking an absolute value of complex Fourier coefficients.

13. The method of claim 9, further comprising subtracting adjacent contrast enhanced projection data from the x-ray data before generating the time-attenuation curves for the vessel using the x-ray data.

14. The method of claim 9, wherein the x-ray data includes at least one of quantitative digital subtraction angiography data or four-dimensional digital subtraction angiography data.

15. The method of claim 9, further comprising determining a centerline for the vessel and identify the plurality of points on the centerline.

16. The method of claim 15, wherein the plurality of points are uniformly distributed over the centerline.

17. The method of claim 9, wherein the quantified flow or velocity through the vessel includes a quantified velocity measure of flow or velocity through the vessel.

18. The method of claim 9, wherein the peak frequency in the spatio-temporal map corresponding to flow or velocity in the vessel is a maximum value in a power spectrum representing a fundamental frequency peak.

19. The method of claim 9, further comprising subtracting a global mean of the time attenuation map to remove a constant offset or performing a zero padding to decrease the spacing between frequencies.

20. The method of claim 9, further comprising determining harmonic frequencies using the spatio-temporal map and using the harmonic frequencies to identify systolic and diastolic flow within the vessel.

* * * * *